(12) United States Patent
Rhea et al.

(10) Patent No.: US 7,313,728 B2
(45) Date of Patent: Dec. 25, 2007

(54) METHOD AND SYSTEM FOR LOGGING AND ACCESSING DIAGNOSTIC RESULT MESSAGES

(75) Inventors: Paul Anthony Rhea, Lawrenceville, GA (US); Saikat Bhattacharjee, Norcross, GA (US); Satheesh Thomas, Kottayam District (IN)

(73) Assignee: American Megatrends, Inc., Norcross, GA (US)

( * ) Notice: Subject to any disclaimer, the term of this patent is extended or adjusted under 35 U.S.C. 154(b) by 559 days.

(21) Appl. No.: 10/358,515

(22) Filed: Feb. 5, 2003

(65) Prior Publication Data
US 2004/0153776 A1 Aug. 5, 2004

(51) Int. Cl.
*G06F 11/00* (2006.01)
(52) U.S. Cl. .............................. 714/25; 714/26; 714/57
(58) Field of Classification Search ................. 714/25, 714/46, 57, 26
See application file for complete search history.

(56) References Cited

U.S. PATENT DOCUMENTS

| | | | | |
|---|---|---|---|---|
| 5,023,873 | A | 6/1991 | Stevenson et al. ............. | 714/4 |
| 6,460,151 | B1 | 10/2002 | Warwick et al. ............. | 714/718 |
| 6,467,054 | B1 | 10/2002 | Lenny ......................... | 714/42 |
| 6,609,217 | B1 * | 8/2003 | Bonissone et al. ............ | 714/26 |
| 6,697,969 | B1 * | 2/2004 | Merriam ...................... | 714/46 |
| 6,738,931 | B1 * | 5/2004 | Osborn et al. ................ | 714/37 |
| 6,754,664 | B1 | 6/2004 | Bush ........................... | 707/102 |
| 6,865,691 | B1 * | 3/2005 | Brundridge et al. .......... | 714/25 |
| 7,010,718 | B2 * | 3/2006 | Ogawa et al. ................ | 714/4 |
| 7,043,566 | B1 | 5/2006 | Grant et al. ................ | 719/323 |
| 7,139,938 | B2 * | 11/2006 | Marwaha ..................... | 714/48 |
| 2002/0103612 | A1 | 8/2002 | Szucs et al. ................ | 702/122 |
| 2003/0009373 | A1 * | 1/2003 | Ensing et al. ................ | 705/10 |
| 2003/0028826 | A1 | 2/2003 | Balluff ........................ | 714/44 |
| 2003/0140279 | A1 | 7/2003 | Szucs et al. ................ | 714/31 |
| 2004/0006652 | A1 | 1/2004 | Prall et al. .................. | 709/318 |
| 2004/0083406 | A1 * | 4/2004 | Goto ........................... | 714/25 |
| 2005/0081111 | A1 | 4/2005 | Morgan et al. ............... | 714/38 |

OTHER PUBLICATIONS

"A Diagnostic Model In CIM," Distributed Management Task Force-DMTF, Jan. 6, 2000, www.dmtf.org/var/release/Whitepapers.
U.S. Appl. No. 10/352,577, filed Jan. 31, 2003, entitled "Method, System and Apparatus For Utilizing Device-Specific Diagnostic Settings Within A Standard Platform," Inventors: Saikat Bhattacharjee; Ganesan Vengateswaran; Paul Anthony Rhea; Stefano Righi.
U.S. Appl. No. 10/355,315, filed Jan. 31, 2003, entitled "Event Mechanism For Reporting Diagnostic Event Messages," Inventors: Saikat Bhattacharjee; Paul Anthony Rhea; Ganesan Vengateswaran.

* cited by examiner

*Primary Examiner*—Gabriel Chu
*Assistant Examiner*—Joshua Lohn
(74) *Attorney, Agent, or Firm*—Hope Baldauff Hartman, LLC

(57) ABSTRACT

A method, system, computer-readable medium, and computer-controlled apparatus are provided for logging and accessing diagnostic result messages. Diagnostic client modules transmit diagnostic result messages to a diagnostic event service module. The diagnostic event service module receives diagnostic result messages from the diagnostic client modules and relays the messages to diagnostic subscriber modules. Diagnostic subscriber modules may comprise a log writer module for storing the messages in a diagnostic results database or a progress viewer module for displaying an indication of the progress of a diagnostic test based on the diagnostic result messages. A query access layer module, a log viewer module, a report tools module, and a report server module may also be provided.

22 Claims, 15 Drawing Sheets

METHOD AND SYSTEM FOR LOGGING AND ACCESSING DIAGNOSTIC RESULT MESSAGES

TECHNICAL FIELD

Embodiments of the invention generally relate to the field of computer diagnostics and, more particularly, to the field of logging and accessing diagnostic messages generated by diagnostic application programs.

BACKGROUND OF THE INVENTION

Diagnostic application programs, also called "diagnostics," provide functionality for testing components in a computer system. Typical diagnostics include a console application program that allows a user to control the operation of the diagnostics and one or more diagnostics modules that perform the actual diagnostic tests. Diagnostics modules are available for testing virtually all of the components in a computer system. For instance, diagnostic modules exist for testing the operation of central processing units, main memory, mass storage devices, video cards, input/output devices, network devices, and other components of a computer system.

During the course of performing diagnostic tests, diagnostic modules may generate a number of result messages. For instance, during the course of a diagnostic test, messages may be generated indicating that the test has begun, indicating that various milestones have been reached in the test, indicated that the test has been completed, and indicating the results of the test. These messages are typically displayed to a user to provide an indication of the progress of the test.

The many diagnostic result messages that are generated during the execution of a diagnostic test are generally stored in the objects and classes that implement the diagnostic test. While storage of the messages in this manner provides quick access to the messages during the execution of the diagnostic test, this implementation causes the diagnostic result messages to be lost when the diagnostic test is closed and the object storing the messages is destroyed. When these messages are lost, valuable information is destroyed regarding the execution of the test and any errors encountered during the test.

One method for saving diagnostic result messages, and thereby making the messages persistent, involves saving the diagnostic result messages to a flat text file on disk. Typically, diagnostic result messages are saved to the text file as they are generated. In this manner, the diagnostic result messages are stored and made available for future retrieval. However, storage of diagnostic result messages in this manner makes it difficult to extract meaningful data from the flat text files. In particular, it is often difficult and slow to search flat text files for large quantities of desired data. These problems are further exaggerated as the size of the text file containing the diagnostic result messages increases.

Therefore, in light of the above, there is a need for a method and system for logging diagnostic result messages that can capture, store, and provide retrieval facilities for diagnostic result messages generated by diagnostic modules. There is an additional need for a method and system for accessing diagnostic result messages that can provide a robust interface for retrieving stored diagnostic result messages and generating reports from the retrieved data.

SUMMARY OF THE INVENTION

Embodiments of the invention solve the above-described problems by providing a system for logging and accessing diagnostic result messages that can capture, store, and provide robust retrieval facilities for diagnostic result messages generated by diagnostic modules. According to one embodiment of the invention, the system includes one or more diagnostic client modules, a diagnostic event service module, and one or more diagnostic subscriber modules. The diagnostic client modules perform diagnostic tests on various components of a computer system. During the performance of the diagnostic tests, the diagnostic client modules may generate diagnostic result messages, such as start and stop messages, progress messages, and error messages. The diagnostic modules transmit the diagnostic result messages to the diagnostic event service module.

The diagnostic event service module receives diagnostic result messages from the diagnostic client modules and relays the messages to the diagnostic subscriber modules. According to various embodiments of the invention, the diagnostic event service module includes a client message handler object for receiving the diagnostic result messages from the diagnostic client modules. The diagnostic event service module may also include a dispatcher thread that receives the result messages from the client message handler object. The dispatcher thread then identifies destination subscriber threads for the messages based upon subscription information provided by subscriber proxy objects associated with the subscriber threads. Once the destination subscriber threads have been identified, the dispatcher thread delivers the diagnostic result messages to the appropriate subscriber thread. The subscriber thread subsequently transmits the message to a connected diagnostic subscriber module.

According to various embodiments of the invention, the diagnostic subscriber modules may comprise a log writer module or a progress viewer module. The log writer module receives diagnostic result messages from the diagnostic event service module and stores the messages in a diagnostic results database. The progress viewer module receives diagnostic result messages from the diagnostic event service module and displays an indication of the progress of the diagnostic test based on the diagnostic result messages.

According to another embodiment of the invention, the system also includes a query access layer module that provides an interface for querying the diagnostic results database. A log viewer module may also be provided that can accept a query, format and transmit the query to the query access layer module, receive a response to the query from the query access layer module, and display the response. A report tools module may also be provided for generating a displayable report from a query response generated by the query access layer module. According to various embodiments of the invention, the system may also include a report server module for providing an external interface to the query access layer module.

Embodiments of the invention also provide a method, apparatus, and computer-readable medium for logging and accessing diagnostic result messages. Additional details regarding the various embodiments of the present invention will be described in greater detail in the Detailed Description that follows.

DETAILED DESCRIPTION OF AN ILLUSTRATIVE EMBODIMENT

As described briefly above, embodiments of the present invention provide a method, system, apparatus, and computer-readable medium for logging and accessing diagnostic result messages. Referring now to the figures, in which like numerals represent like elements, several illustrative embodiments of the present invention will be described. It should be appreciated that the embodiments described herein are merely illustrative and that the various embodiments may be combined, other embodiments may be utilized, and structural, logical, and architectural changes may be made without departing from the spirit and scope of the present invention. The following detailed description is, therefore, not to be taken in a limiting sense, and the scope of the present invention is defined only by the appended claims and their equivalents.

Figure 1:
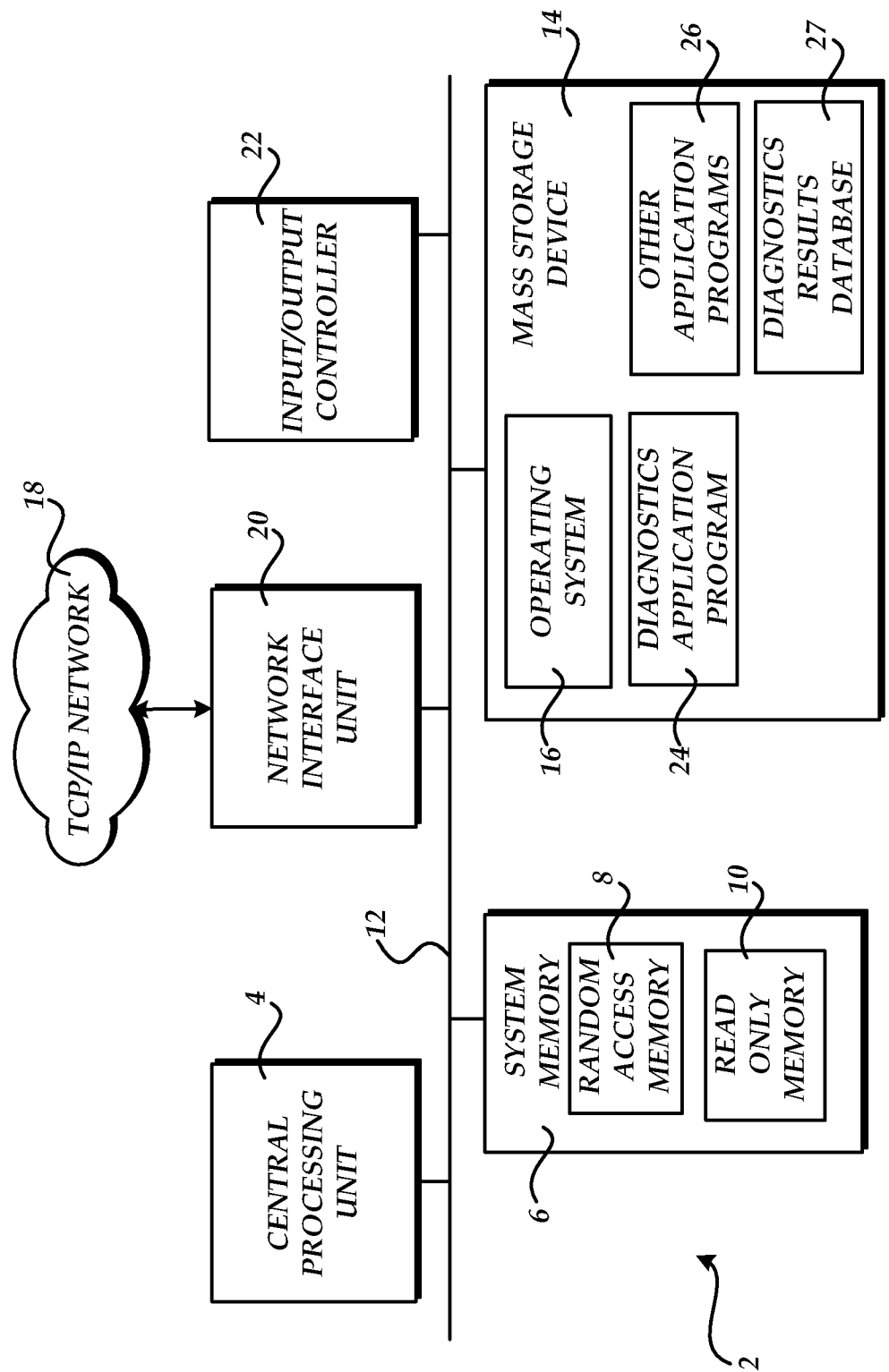
FIG. 1 is a computer architecture diagram showing an illustrative computer architecture for a computer utilized in various embodiments of the invention.

Turning now to FIG. 1, an illustrative computer architecture for a computer 2 for practicing the various embodiments of the invention will be described. The computer architecture shown in FIG. 1 illustrates a conventional computer system, including a central processing unit 4 ("CPU"), a system memory 6, including a random access memory 8 ("RAM") and a read-only memory ("ROM") 10, and a system bus 12 that couples the memory to the CPU 4. A basic input/output system containing the basic routines that help to transfer information between elements within the computer, such as during startup, is stored in the ROM 10. The personal computer 2 further includes a mass storage device 14 for storing an operating system 16, programs, such as a diagnostics application program 24, a diagnostic results database 27, other applications programs 26, and data.

The mass storage device 14 is connected to the CPU 4 through a mass storage controller (not shown) connected to the bus 12. The mass storage device 14 and its associated computer-readable media, provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed by the computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

Communication media typically embodies computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

According to various embodiments of the invention, the computer 2 may operate in a networked environment using logical connections to remote computers through a TCP/IP network 18, such as the Internet. The computer 2 may connect to the TCP/IP network 18 through a network interface unit 20 connected to the bus 12. It should be appreciated that the network interface unit 20 may also be utilized to connect to other types of networks and remote computer systems. The computer 2 may also include an input/output controller 22 for receiving and processing input from a number of devices, including a keyboard or mouse (not shown). Similarly, an input/output controller 22 may provide output to a display screen, a printer, or other type of output device.

As mentioned briefly above, a number of program modules and data files may be stored in the mass storage device 14 and RAM 8 of the computer 2, including an operating system 16 suitable for controlling the operation of the computer 2, such as the WINDOWS family of operating systems from MICROSOFT CORPORATION of Redmond, Wash. Other types of suitable operating systems may also be utilized. The mass storage device 14 and RAM 8 may also store one or more executable programs. In particular, the mass storage device 14 and RAM 8 may store a diagnostics application program 24.

The diagnostics application program 24 is one or more executable programs for performing tests on the computer 2 and diagnosing failures and potential failures within the various systems of the computer 2. The diagnostics application program 24 may perform tests on the mass storage device 14, the system memory 6, the network interface unit 20, and other components of the computer 2. Diagnostic result messages generated by the diagnostics application program may be stored in the diagnostic results database 27. Additional details regarding the architecture and operation of the diagnostics application program 24 and the diagnostic results database 27 according to the various embodiments provided herein will be provided below with respect to FIGS. 2-15.

Figure 2:
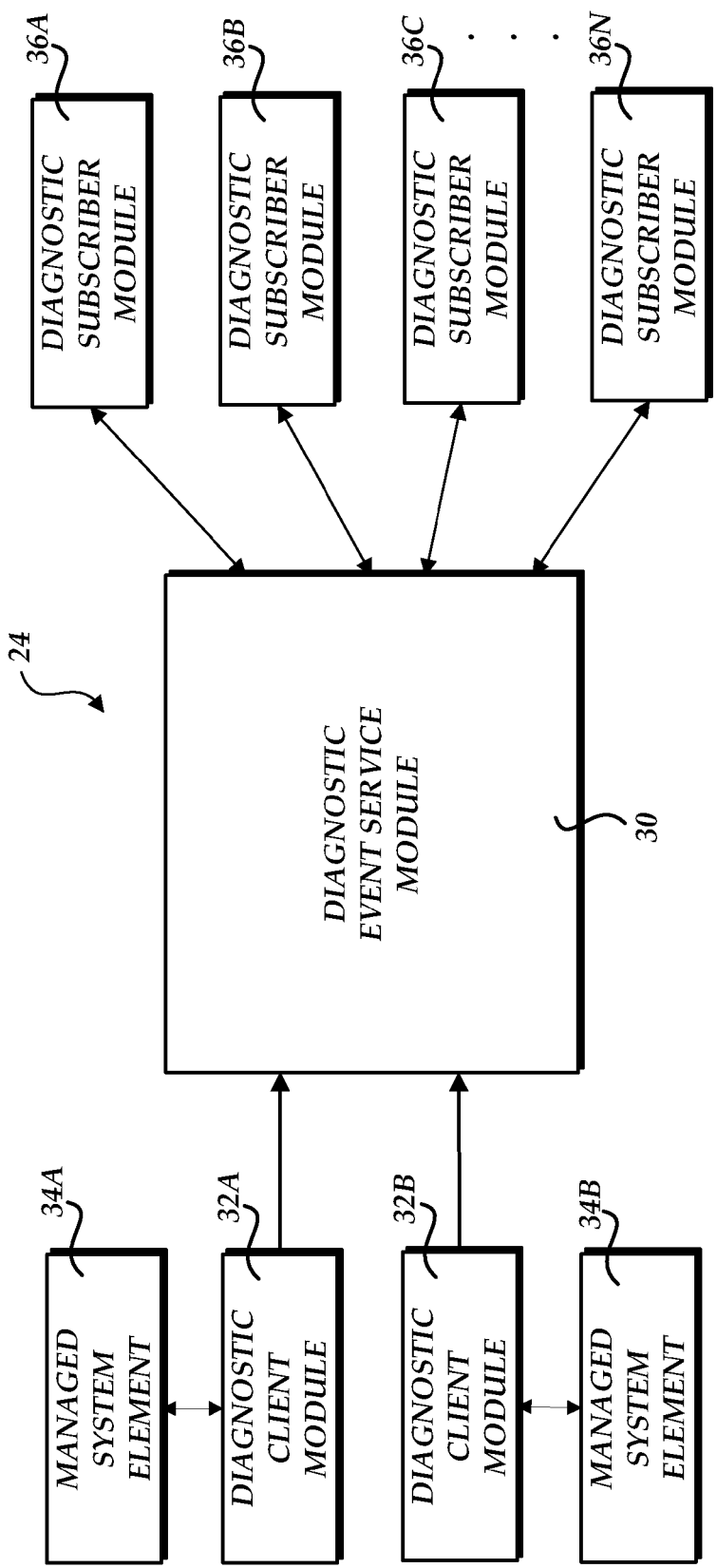
FIG. 2 is a software architecture diagram showing aspects of a diagnostics application program provided by embodiments of the invention.

Referring now to FIG. 2, a software architecture utilized in the various embodiments of the present invention will be described. As shown in FIG. 2, one or more diagnostic client modules, 32A-32B are provided. The diagnostic client modules 32A-32B comprise software modules for performing diagnostic tests on one or more managed system elements 34A-34B of a computer system, such as the computer 2. The managed system elements 34A-34B may comprise any of the conventional components of a computer system such as those described above with respect to FIG. 1, including both hardware and software components.

During the performance of a diagnostic test, a diagnostic client module 32A may generate one or more diagnostic result messages. For instance, the diagnostic client module 32 may generate messages indicating that a diagnostic test has begun, identifying errors encountered during the execution of the diagnostic test, progress messages, messages indicating that the diagnostic test has completed, and other types of messages. According to the various embodiments of the invention, the diagnostic client module 32A may transmit the diagnostic result messages to a diagnostic event service module 30. Additional details regarding the operation of the diagnostic client modules 32A-32B will be described in greater detail below with respect to FIG. 9.

The diagnostic event service module 30 receives the diagnostic result messages from the diagnostic client modules 32A-32B and forwards the diagnostic result messages to one or more diagnostic subscriber modules 36A-36N. The diagnostic event service module 30 may identify an appropriate diagnostic subscriber module for each message based on subscription information obtained from the diagnostic subscriber modules 36A-36N. Additional details regarding the architecture and operation of the diagnostic event service module 30 will be provided below with respect to FIGS. 3 and 10.

The diagnostic subscriber modules 36A-36N communicate with the diagnostic event service module 30. In particular, the diagnostic subscriber modules 36A-36N may provide subscription information to the diagnostic event service module 30 identifying the various types of diagnostic result messages they would like to receive. Moreover, the diagnostic subscriber modules 36A-36N may then receive diagnostic result messages from the diagnostic event service module 30. The diagnostic subscriber modules 36A-36N may then perform various functions on the messages, including displaying the messages and performing other tasks. According to the various embodiments of the present invention, the diagnostic subscriber modules 36A-36N may comprise a log writer module or a progress viewer module. Additional details regarding the architecture and operation of the diagnostic subscriber modules 36A-36N will be provided in greater detail below with respect to FIGS. 3-6 and FIGS. 11-12.

Figure 3:
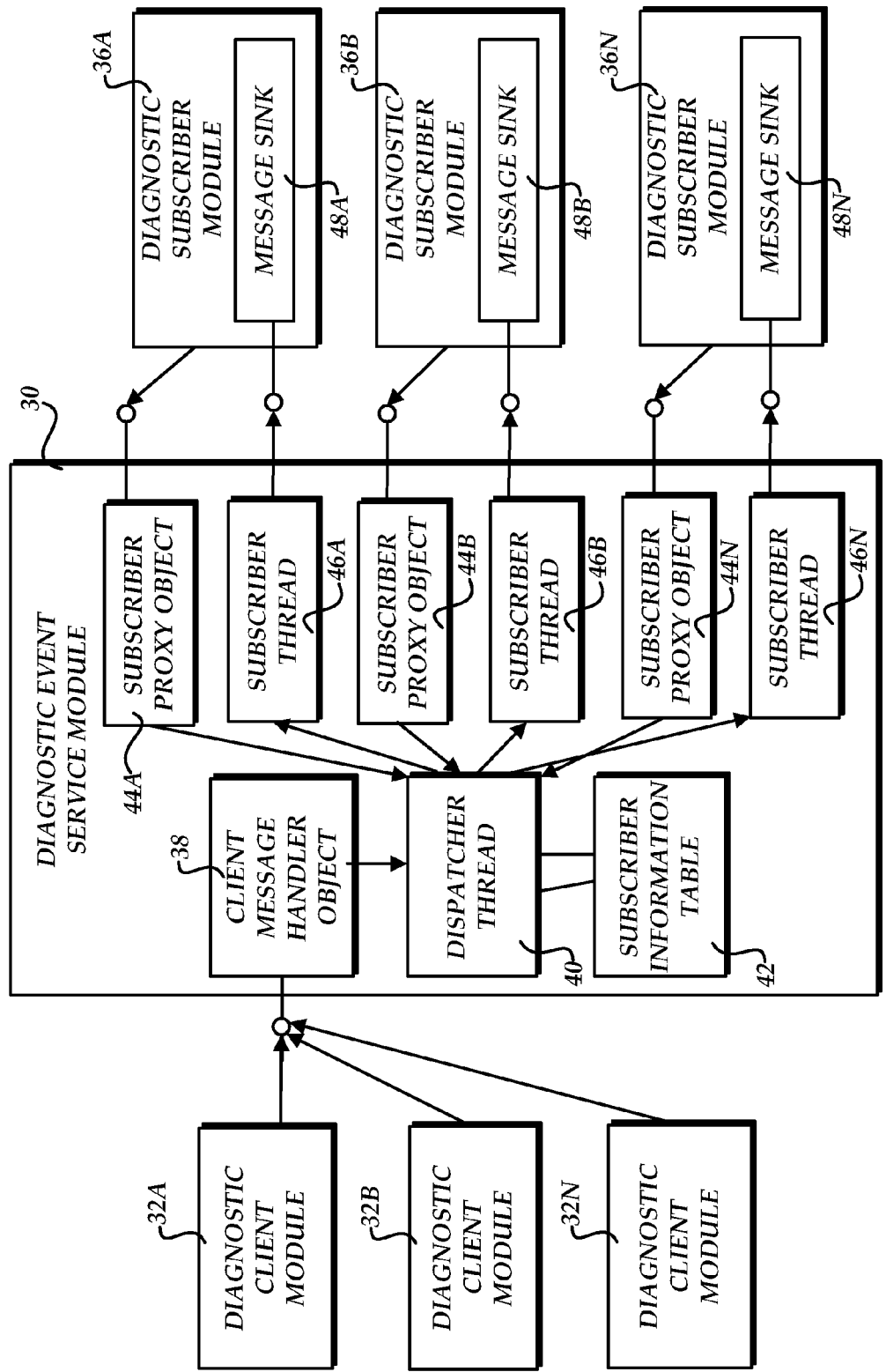
FIG. 3 is a software architecture diagram illustrating aspects of a diagnostic event service module provided by embodiments of the present invention.

Referring now to FIG. 3, additional details regarding the software architecture utilized to implement embodiments of the invention will be described. As shown in FIG. 3, the diagnostic event service module 30 includes a client message handler object 38 for communicating with the diagnostic client modules 32A-32N. The client message handler object 38 receives diagnostic result messages from the diagnostic client modules 32A-32N and transmits the diagnostic result messages to a dispatcher thread 40. The dispatcher thread 40 receives the diagnostic result messages from the client message handler object 38 and identifies destination subscriber threads 46A-46N for each of the diagnostic result messages. According to one embodiment of the invention, the dispatcher thread 40 may identify the destination subscriber thread by consulting data contained in a subscriber information table 42. The subscriber information table 42 contains subscription information provided by subscriber proxy objects 44A-44N associated with each of the subscriber threads 46A-46N. The subscriber information is received by the subscriber proxy objects 44A-44N from a diagnostic subscriber module 36A-36N.

Once the dispatcher thread 40 has identified appropriate subscriber threads 46A-46N for receiving a diagnostic result message, the dispatcher thread transmits the message to the appropriate subscriber thread. The subscriber threads 46A-46N receive the diagnostic result messages from the dispatcher thread 40 and transmit the diagnostic result messages to the corresponding connected diagnostic subscriber module 36A-36N. The diagnostic subscriber modules 36A-36N include a message sink 48A-48N for receiving the diagnostic result messages. The diagnostic subscriber modules 36A-36N also communicate with the subscriber proxy objects 44A-44N. In particular, the diagnostic subscriber modules 36A-36N may provide subscription information to the subscriber proxy objects identifying the particular diagnostic result messages that they should receive. Additional details regarding the operation of the diagnostic event service module 30 and the communication between the diagnostic event service module 30, the diagnostic client modules 32A-32N, and the diagnostic subscriber modules 36A-36N will be described below in greater detail with respect to FIGS. 4 and 10.

Figure 4:
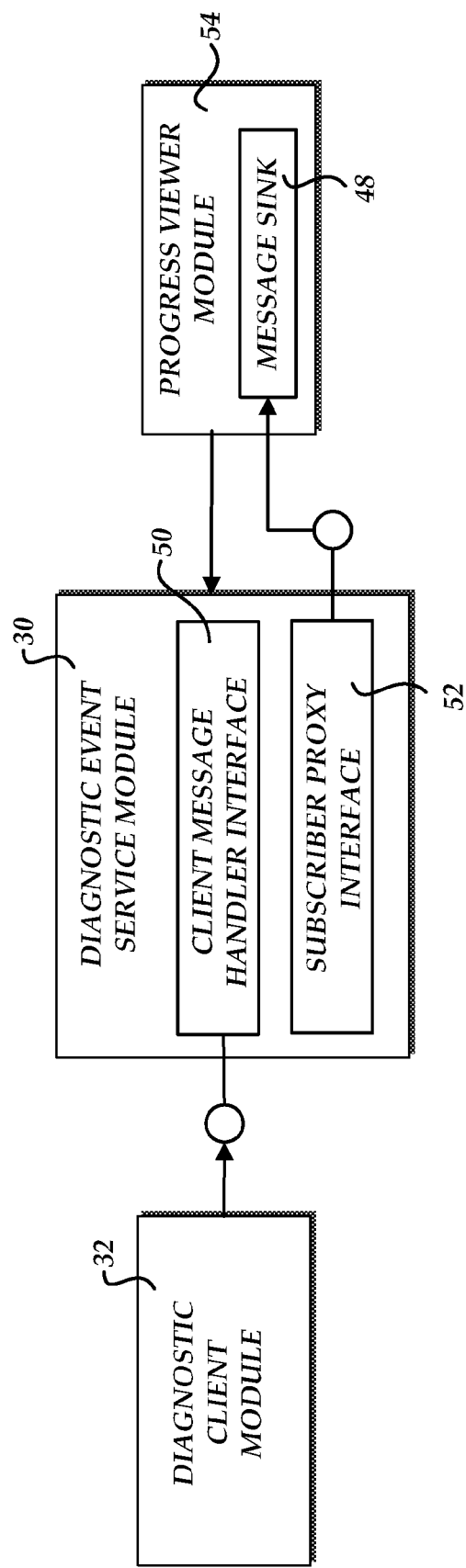
FIG. 4 is a software architecture diagram illustrating aspects of a progress viewer module provided by embodiments of the present invention.
Figure 5:
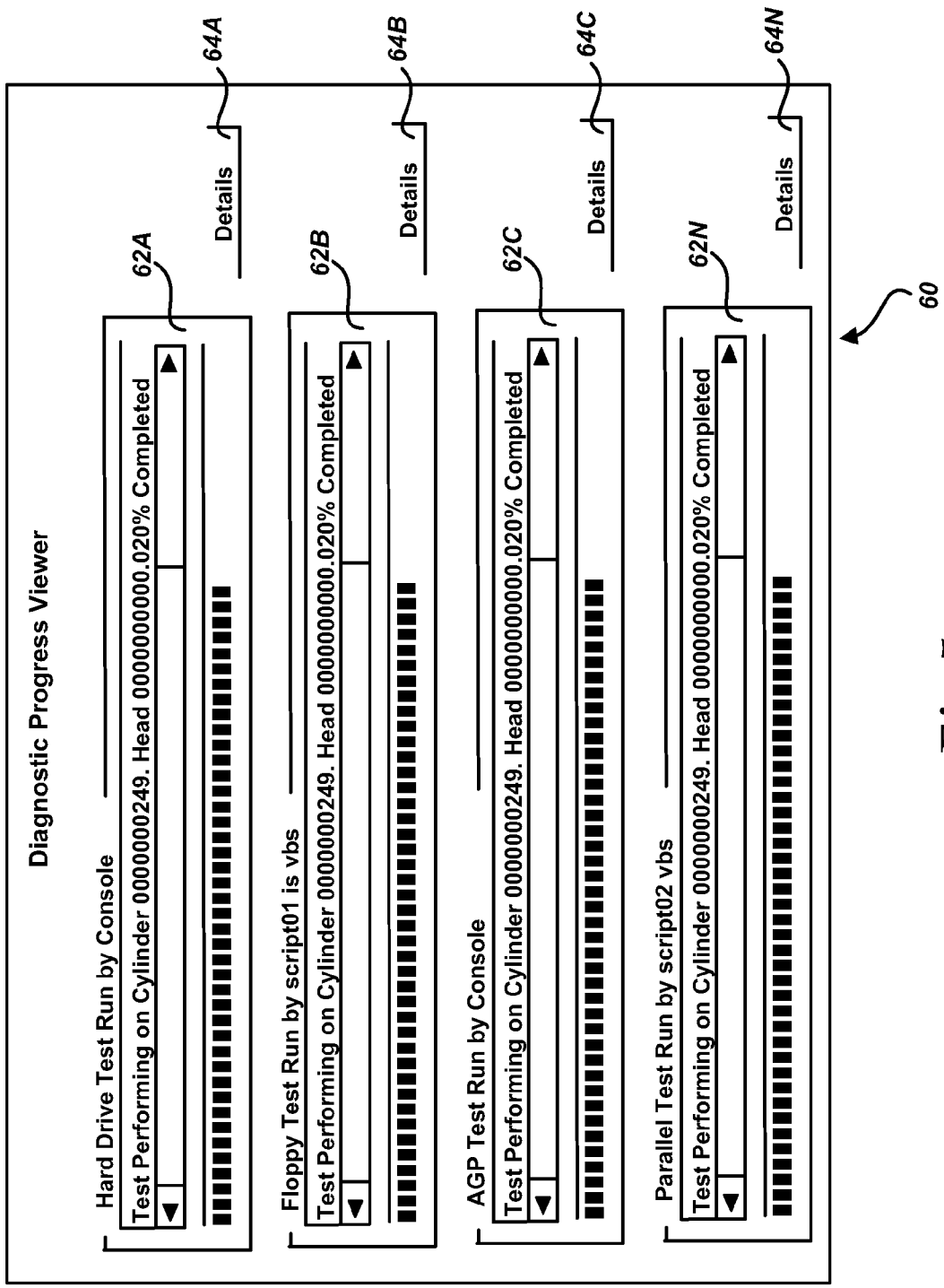
FIG. 5 is a screen diagram showing an illustrative screen display provided by a progress viewer module in one embodiment of the invention.

Referring now to FIGS. 4, and 5, additional details regarding one actual embodiment of the present invention will be described. As shown in FIG. 4, a progress viewer module 54 may be provided according to one embodiment of the invention for displaying the progress of a diagnostic test based on diagnostic result messages received from a diagnostic client module. In particular, as shown in FIG. 4, a diagnostics client module 32 provides diagnostic result messages to the diagnostic event service module 30 through a client interface 50. As described above, the diagnostic event service module 30 provides a subscriber interface 52 through which the diagnostic result messages are provided to the message sink 48.

The progress viewer module 54 may also provide subscriber information to the diagnostic event service module 30 indicating that all diagnostic results messages be provided to the progress viewer module 54 or that diagnostic results messages for specific diagnostic client modules be provided. When diagnostic results messages are received at the progress viewer module 54, the progress viewer module 54 is operative to generate an indication of the progress of the diagnostic test on a user interface device. FIG. 5 shows an illustrative user interface window 60 provided by a progress viewer module 54 in one embodiment of the invention.

As shown in FIG. 5, the user interface window 60 includes a number of user interface objects 62A-62N. Each of the user interface objects 62A-62N includes progress information corresponding to a particular diagnostic. For instance, the user interface object 62A identifies progress information for a hard disk drive test, and the user interface object 62B includes progress information for a floppy disk test. Additional details may also be obtained from the progress viewer module 54 by selecting one of the user interface buttons 64A-64N corresponding to each user interface object 62A-62N. It should be appreciated that the user interface window shown in FIG. 5 is merely illustrative and that other types of user interfaces may be provided for visually showing the progress of a diagnostic based on diagnostic result messages provided by a diagnostic client module. Additional details regarding the operation of the progress viewer module 54 will be provided below with respect to FIG. 12.

Figure 6:
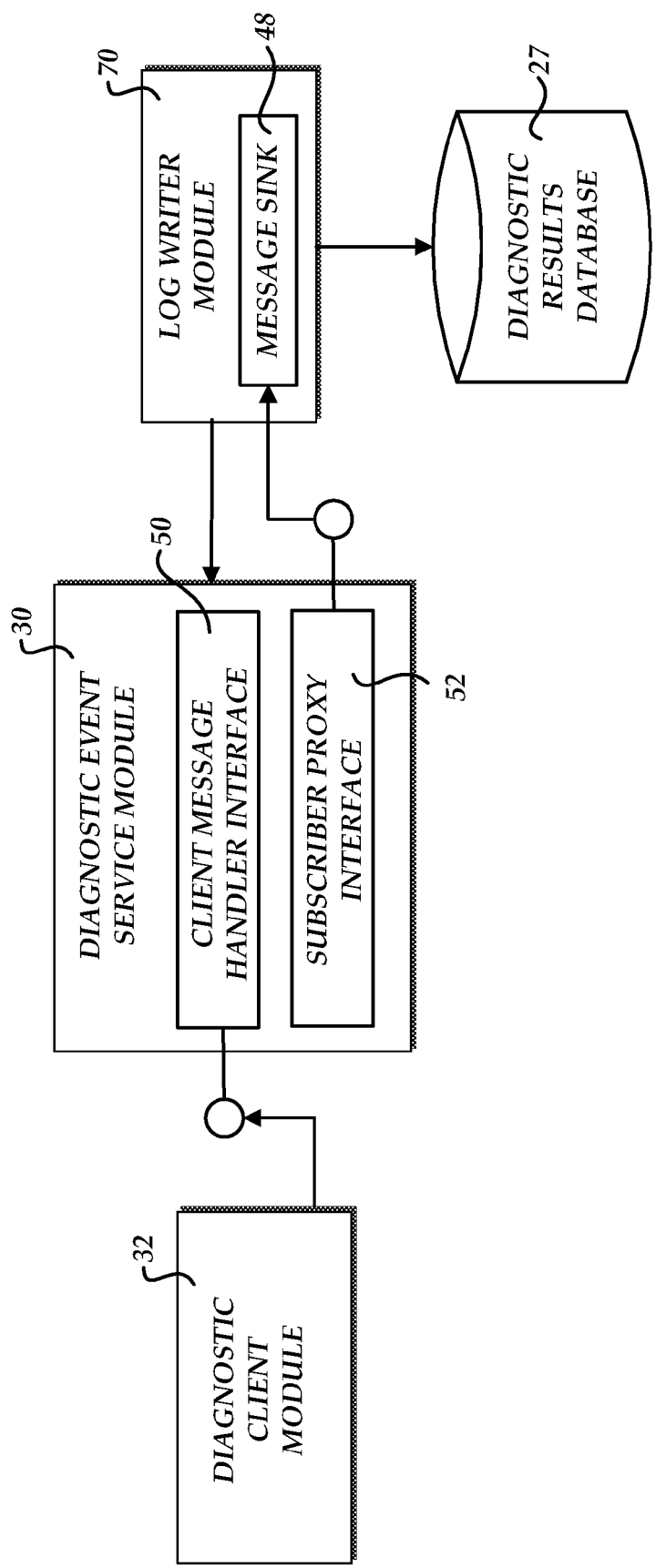
FIG. 6 is a software architecture diagram illustrating aspects of a log writer module provided by embodiments of the present invention.

Turning now to FIG. 6, additional details will be provided regarding aspects of one embodiment of the invention. In particular, according to this embodiment of the invention, a log writer module 70 is provided for storing the diagnostic result messages received from the diagnostic event service module 30 in a diagnostic results database 27. In particular, the log writer module 70 subscribes for and receives diagnostic result messages from the subscriber interface 52. In response to receiving the diagnostic result messages, the log writer module 70 stores the messages in a diagnostic results database 27. As will be described in greater detail below, according to various embodiments of the invention, the diagnostic result messages are transmitted as data structures expressed using an extensible mark-up language, such as XML. The diagnostic results database 27 is a relational database that allows easy storage and retrieval of the diagnostic information generated by the diagnostic client modules 32.

Figure 7:
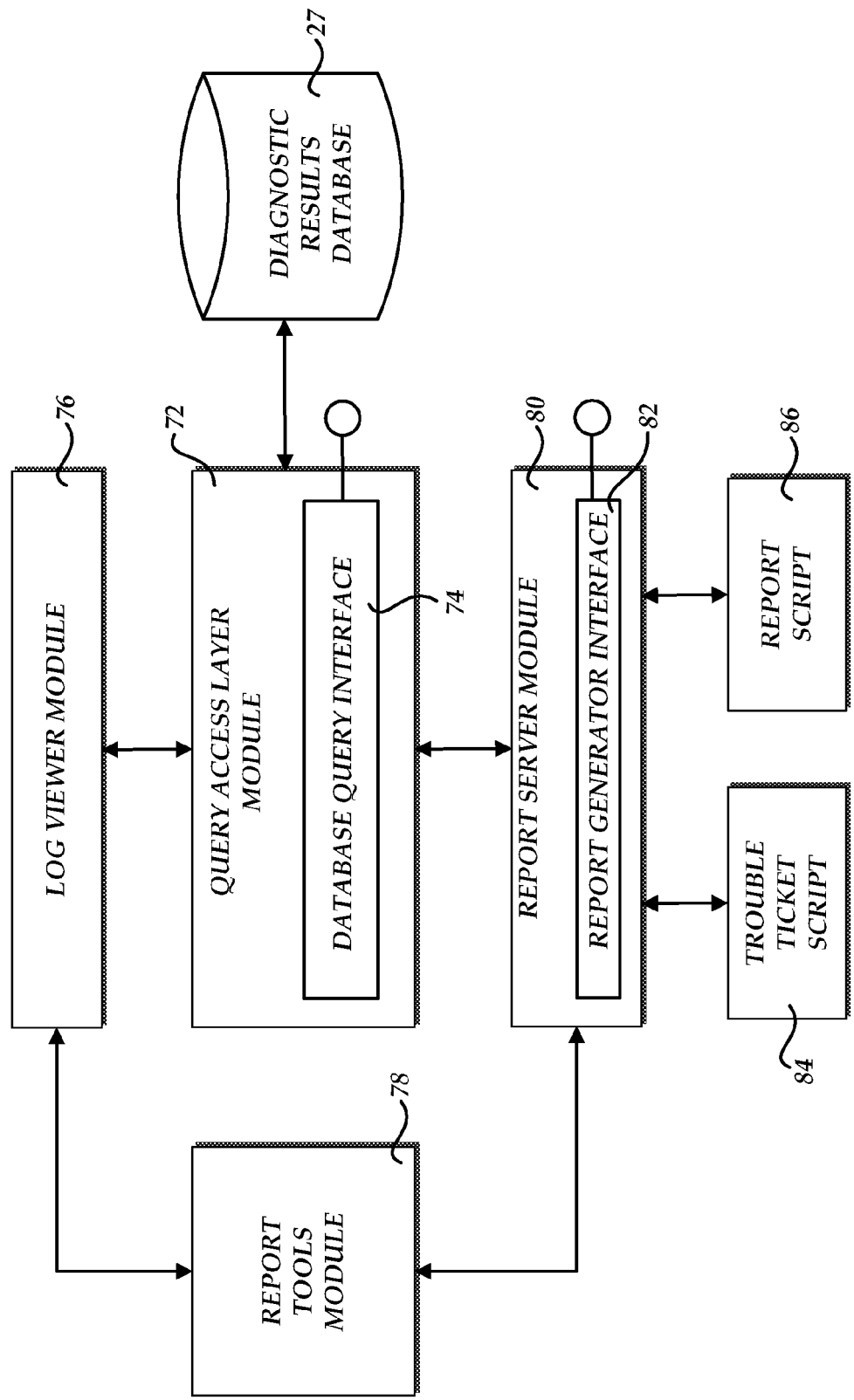
FIG. 7 is a software architecture diagram illustrating aspects of a log viewer module, a query access layer module, and a report server module provided by embodiments of the present invention.

Referring now to FIG. 7, an illustrative software architecture for providing a log viewer module, a query access layer module, and a report server module will be described. As shown in FIG. 7, a query access layer module 72 is provided. The query access layer module 72 provides a database query interface 74 that may be called by external programs to query the contents of the diagnostic results database 27. In response to such queries received via the database query interface 74, the query access layer module 72 is operative to identify results matching the query contained in the diagnostic results database 27 and return the results to the calling program.

According to one embodiment of the invention, a log viewer module 76 is also provided. The log viewer module 76 provides functionality for viewing the diagnostic result messages contained in the diagnostic result database 27. In particular, the log viewer module provides a user interface for identifying the particular diagnostic results messages to be viewed, and formats and transmits a query to the query access layer module 72 in response to the request. As described briefly above, the query access layer module 72 queries the diagnostic results database 27 and responds to the request from the log viewer module 76 with search results. The log viewer module 76 is then operative to display the query results. An illustrative user interface for interacting with the log viewer module 76 will be described in greater detail below with respect to FIG. 8.

As shown in FIG. 7, the log viewer module 76 may also communicate with a report tools module 78. The report tools module 78 can accept query responses, such as those provided by the query access layer module 72, and generate viewable reports from the responses. In particular, the report tools module 78 may receive a request from the log viewer module 76 to generate a viewable report based on a query response received from the query access layer module 72. In response to the request, the report tools module 78 is operative to convert the query response into a format viewable within a graphical user interface. According to one embodiment of the invention, the report tools module is operative to convert the response to hypertext mark-up language ("HTML") and return the viewable report to the log viewer module 76. The log viewer module 76 may then display the viewable report for a user. According to various other embodiments of the present invention, the report tools module 78 may also transmit the viewable report via an electronic mail message and perform other types of functions.

According to various embodiments of the invention, a report server module 80 is also provided. The report server module 80 exposes a report generator interface 82 that provides an external interface to the query access layer module 72 to scripts and other automation clients, such as a report script 86 or a trouble ticket script 84. In particular, the report server module 80 may receive a request to query the diagnostic results database 27 from a script or other automation client. In response to the request, the report server module 80 may format and transmit a query to the query access layer module 72. As described above, the query access layer module 72 may query the diagnostic results database 27 in response to the request and provide a response to the report server module 80. When the report server module 80 receives a response, the report server module 80 may transmit the response to the report tools module 78 along with a request to generate a viewable report from the query response.

Once the viewable report has been received by the report server module 80, the viewable report may be provided to the automation client that originally requested a query of the diagnostic results database 27. In particular, the viewable report may be provided to the report script 86 or the trouble ticket script 84. Alternatively, the report tools module 78 may be utilized to transmit the viewable report to another location via an electronic message. The report tools module 78 may also accept options from the report server module 80 or the log viewer module 76 for customizing the viewable report. In response to the receipt of these options, the report tools module 78 may customize the viewable report.

Figure 8:
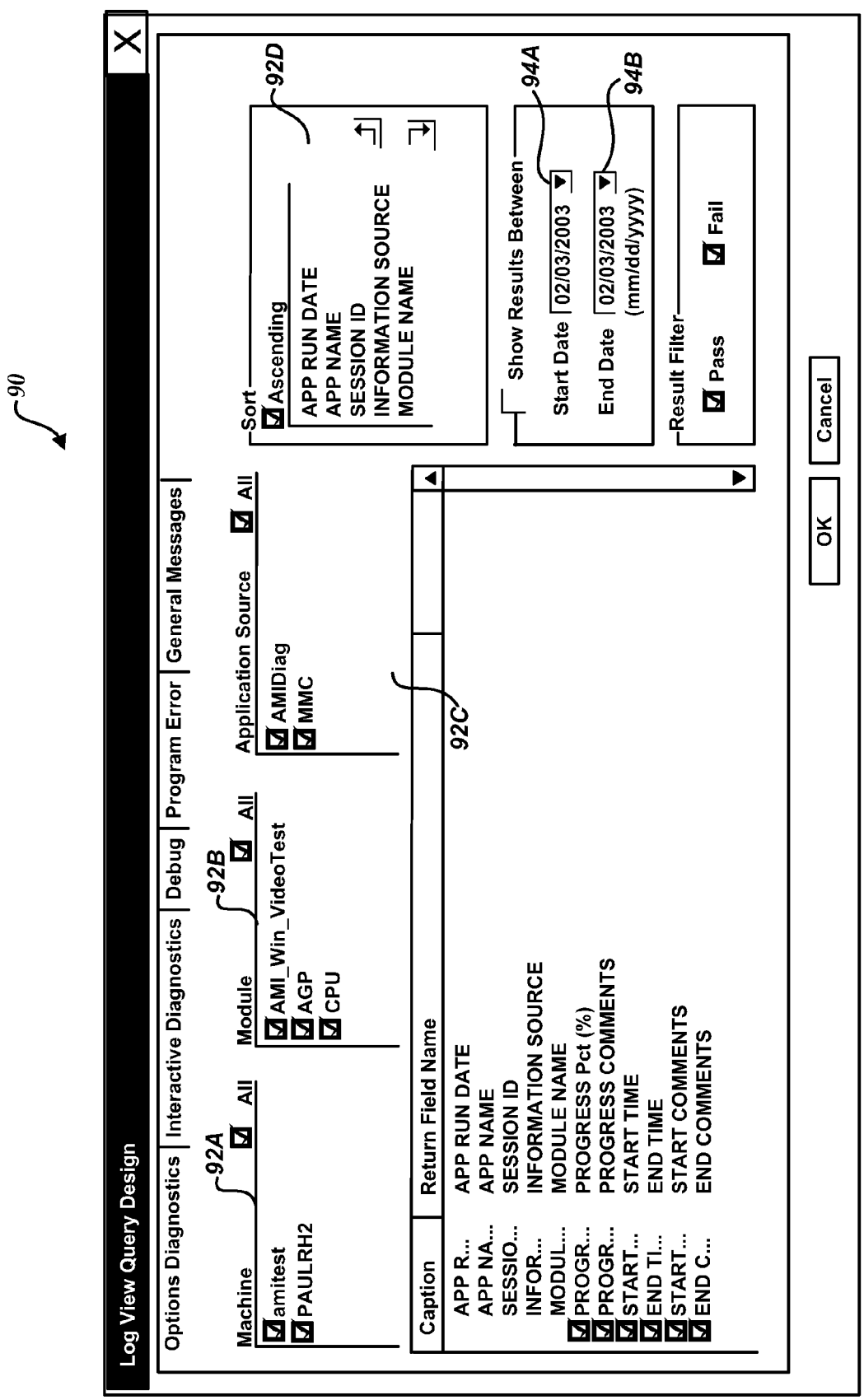
FIG. 8 is a screen diagram showing an illustrative screen display provided by a log viewer module in one embodiment of the invention.

Referring now to FIG. 8, an illustrative user interface window 90 provided by a log viewer module 76 will be described. As discussed briefly above, the log viewer module 76 provides an interface for querying the diagnostics results database 27. In order to receive input regarding the type of messages that should be retrieved from the diagnostic results database 27, the user interface window 90 includes several input areas. For instance, the user interface window 90 includes a list box 92A that allows a user to select one or more machines for which diagnostic result messages should be received. Additionally, the user interface window 90 includes list box 92B that allows a user to specify the particular diagnostics module for the selected machines that should be retrieved. Moreover, a list box 92C is provided that allows the user to identify an application source from which the diagnostic was originally executed.

A user may also specify how the results are presented by selecting choices from the list box 92D. For instance, a user may request that the results be ordered by machine, date, or application. The user interface window 90 also includes input boxes 94A and 94B in which a user may select a range of dates for the retrieved results. The user may also be permitted to select the fields that are displayed with the results. It should be appreciated that the user interface window 90 is illustrative and that other types of user interfaces may also be provided for the log viewer module 76.

Figure 9:
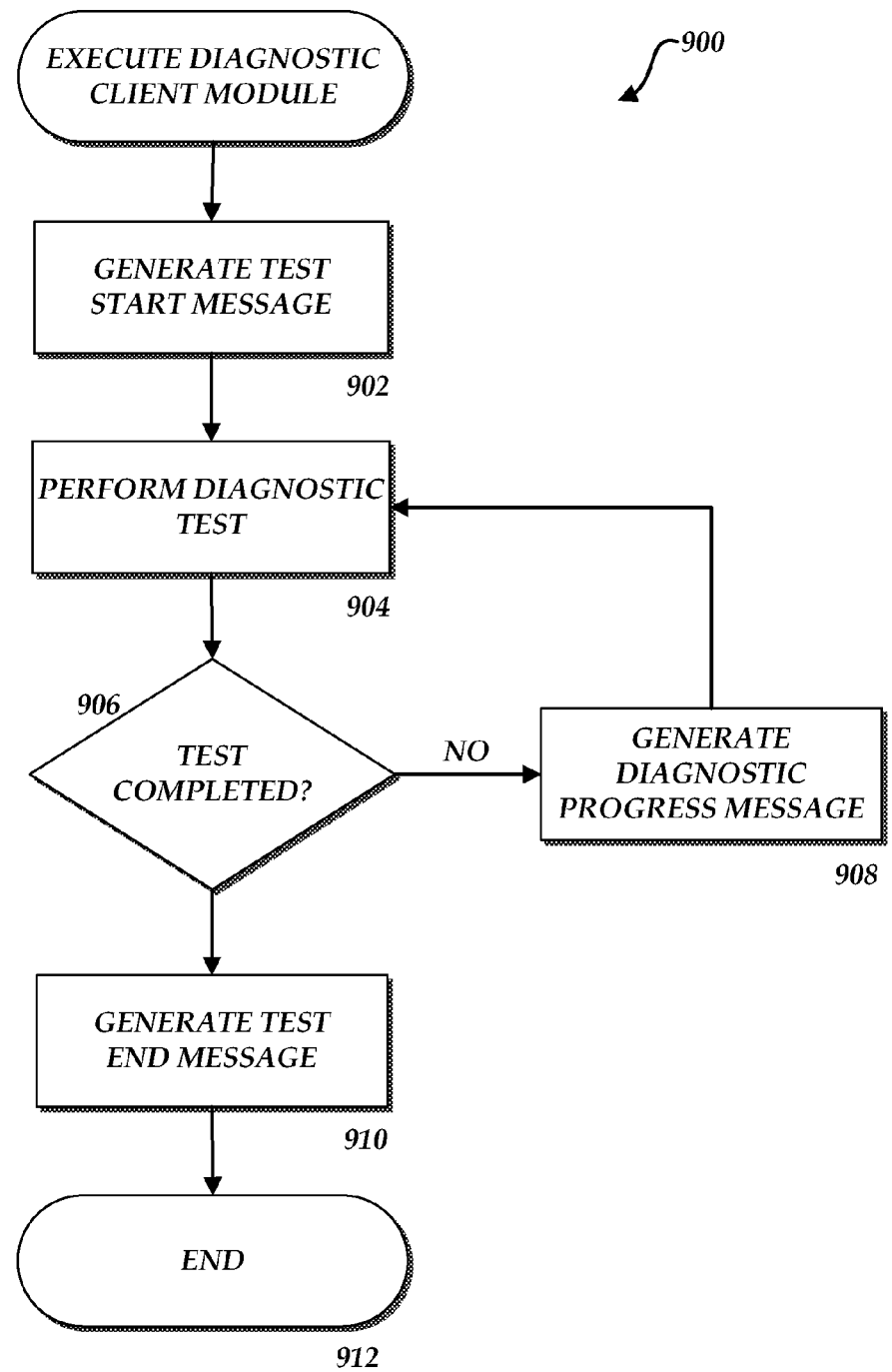
FIG. 9 is a flow diagram illustrating the operation of a diagnostic client module utilized in one embodiment of the invention.

Referring now to FIG. 9, an illustrative routine 900 will be described illustrating the execution of the diagnostics client module 32. The routine 900 begins at block 902, where the diagnostic client module begins performing a diagnostic test on a element of the computer system 2. In response to the start of the diagnostic, the diagnostic client module 32 generates a test start message. The test start message is transmitted to the diagnostic event service module 30. As described briefly above, such messages are expressed using an extensible mark-up language and are utilized to communicate among the various components of the present invention. In particular, the test start message generated by the diagnostic client module 32 is expressed using XML. An illustrative format for such messages is shown below with respect to TABLE 1.

TABLE 1

```
<MESSAGE DATE= "message generation time">
<HEADER APPNAME="Application Name"
    APPSESSION="Application Id"
    APPMACHINE="Application Machine"
    INFOSOURCENAME="Info Source Machine"
    MODULE="Module Name">
</HEADER>
<DESC>
    <DIAGDESC TESTSESSION="Unique Id">
    </DIAGDESC>
</DESC>
</MESSAGE>
```

The messages generated by the diagnostic client module may have four different subtypes. In particular, the subtypes are start, progress, end, and error messages. The "DIAGDESC" tag allows the structure in TABLE 1 to accommodate these types of messages as structures. These are shown in TABLES 2-5.

TABLE 2

```
<DIAGDESC TESTSESSION="Unique Id">
    <DIAGSTART>
        <DATE></DATE>
        <TESTPARAM></TESTPARAM>
        <COMMENTS></COMMENTS>
        <ERRORCODE></ERRORCODE>
    </DIAGSTART>
</DIAGDESC>
```

TABLE 3

```
<DIAGDESC TESTSESSION="Unique Id">
    <DIAGPROG>
        <PCT></PCT>
        <COMMENTS></COMMENTS>
    </DIAGPROG>
</DIAGDESC>
```

TABLE 4

```
<DIAGDESC TESTSESSION="Unique Id">
    <DIAGEND>
        <DATE></DATE>
        <TESTPARAM></TESTPARAM>
        <COMMENTS></COMMENTS>
        <ERRORCODE></ERRORCODE>
        <TESTRESULT></TESTRESULT>
    </DIAGEND>
</DIAGDESC>
```

TABLE 5

```
<DIAGDESC TESTSESSION="Unique Id">
    <DIAGERROR>
        <COMMENTS></COMMENTS>
        <ERRORCODE></ERRORCODE>
    </DIAGERROR>
</DIAGDESC>
```

Once the test start message has been generated at block 902, the routine 900 continues to block 904. The format for the start message is that described above with respect to TABLE 2. At block 904, the diagnostic client module 32 performs the actual diagnostic test. From 904, the routine 900 continues to block 906 where a determination is made as to whether the test has been completed. If the test is not completed, the routine 900 branches to block 908, where a diagnostic progress message is generated by the diagnostic client module 32 and transmitted to the diagnostic event service module 30. The format for the progress message is shown in TABLE 3. From block 908, the routine 900 returns to block 904 where the diagnostic test is continued.

If, at block 906, a determination is made that the diagnostic test has completed, the routine 900 continues to block 910. At block 910 a test end message is generated by the diagnostic client module 32 and transmitted to the diagnostic event service module 30. The test end message is formatted in the manner shown in TABLE 4. From block 910, the routine 900 continues to block 912, where it ends.

Figure 10:
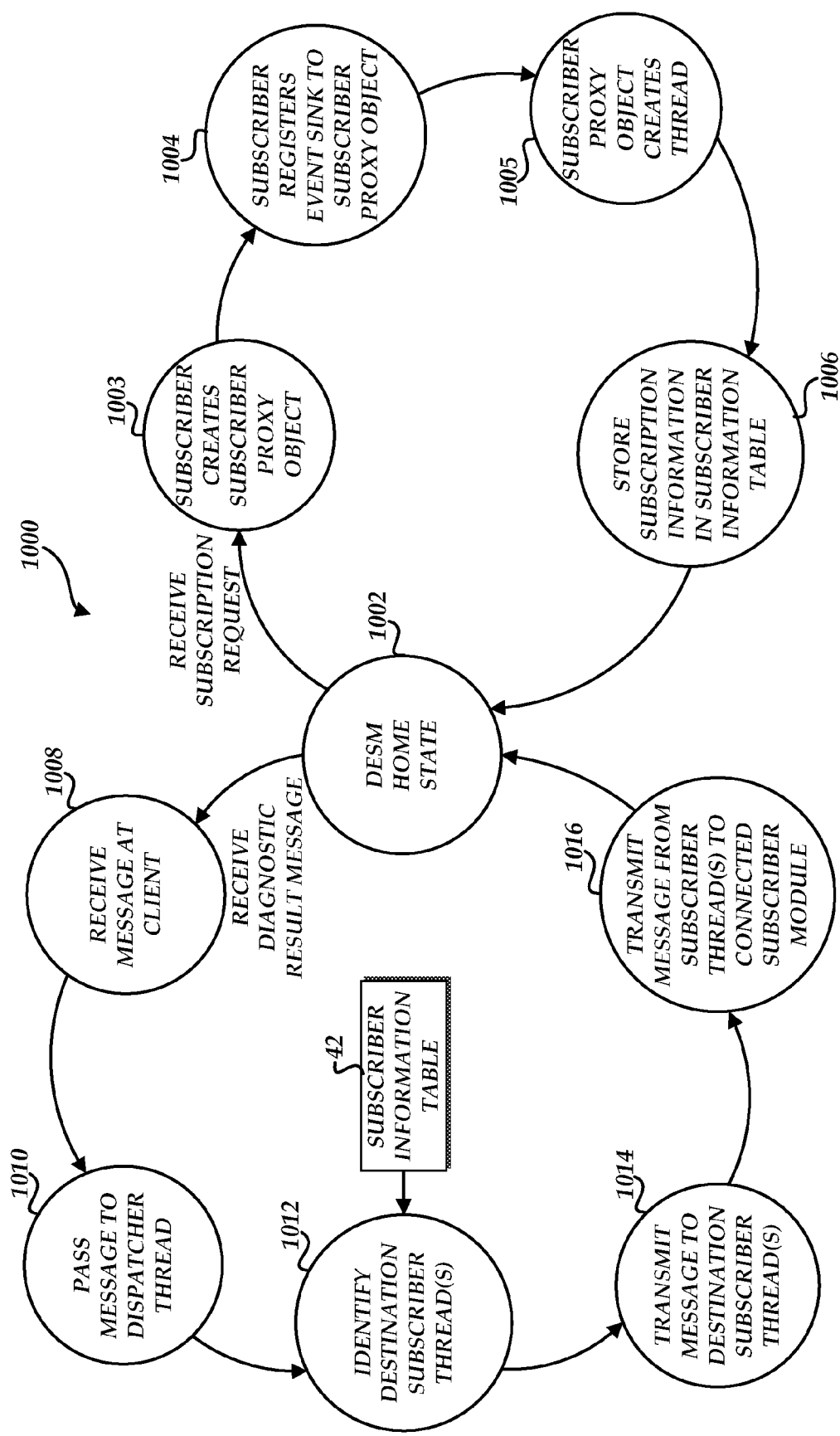
FIG. 10 is a state diagram illustrating the operation of a diagnostic event service module utilized in one embodiment of the present invention.

Referring now to FIG. 10, a state machine 1000 will be described illustrating the operation of the diagnostic event service module 30 according to one embodiment of the invention. The state machine 1000 begins at state 1002, the diagnostic event service module 30 home state. If a diagnostic result message is received from a diagnostic client module 32 while in the home state 1002, the state machine 1000 transitions to state 1008. At state 1008, the message is received at the client message handler object 38. As described above, the message may comprise a start message, a progress message, an end message, or an error message. From state 1008, the state machine 1000 transitions to state 1010, where the message is passed to the dispatcher thread 40.

From state 1010, the state machine 1000 transitions to state 1012 where one or more destination subscriber threads for the received message are identified. In particular, the subscriber information table 42 is consulted by the dispatcher thread 40 to identify subscriber threads 46A-46N that indicated a desire to receive the message. Once the destination subscriber threads have been identified, the state machine 1000 transitions to state 1014 where the message is transmitted to the destination subscriber threads. The state machine 1000 then transitions to state 1016 where the subscriber threads transmit their message to a connected subscriber module 36A-36N. As will be described in greater detail below, the subscriber modules may comprise a log writer module, a progress viewer module, or other type of subscriber module. From state 1016, the state machine 1000 returns to the diagnostic event service module 30 home state 1002.

While in the home state 1002, the diagnostic event service module 30 may also receive a subscription request from a diagnostic subscriber module, such as the diagnostic subscriber module 36A. In response to receiving such a subscription request, the state machine 1000 transitions from state 1002 to state 1003. In state 1003, a new subscriber proxy object is created. As described briefly above, the subscriber proxy object 44 is utilized for communications originating from the diagnostic subscriber module, such as subscription information. From state 1003, the state machine continues to state 1004, where an event sink is registered to the subscriber proxy object. The state machine 1000 then continues to state 1005, where the subscriber proxy object creates a subscriber thread. As discussed above, the subscriber thread 46 is utilized for communications originating at the dispatcher thread, such as for transmitting diagnostic result messages to the diagnostic subscriber module 36.

From state 1005, the state machine 1000 continues to state 1006. At state 1006, the subscription information provided by the diagnostic subscriber module 36 is stored by the dispatcher thread 40 in the subscriber information table 42. As an example, a diagnostic subscriber module may indicate that it would like to receive a particular type of message or all messages. This information is then stored in the subscriber information table 42 for later use in identifying the appropriate diagnostic subscriber module 36A-36N that should receive a particular message. From state 1006, the state machine 1000 returns to the home state 1002.

Figure 11:
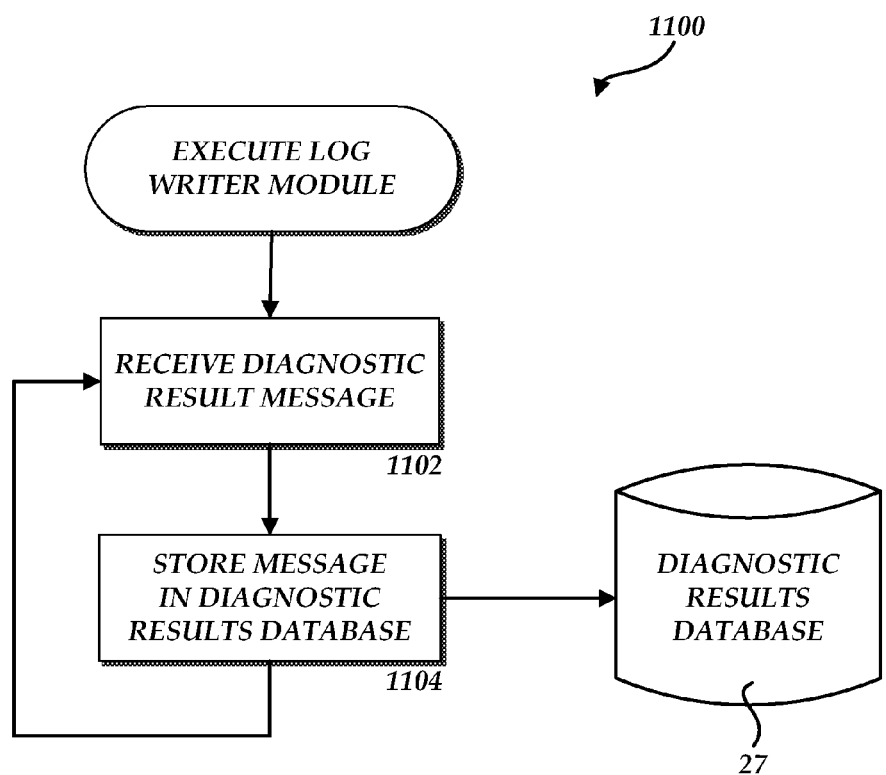
FIG. 11 is a flow diagram illustrating the operation of a log writer module utilized in one embodiment of the invention.

Turning now to FIG. 11, an illustrative routine 1100 will be described illustrating the operation of the log writer module 70. As described briefly above, the log writer module 70 is responsible for receiving diagnostic result messages from the diagnostic event service module 30 and storing the diagnostic messages in the diagnostic results database 27. Accordingly, the routine 1100 begins at block 1102 where the log writer module 70 receives the diagnostic result message from the diagnostic event service module 30.

The routine 1100 then continues from block 1102 to block 1104, where the log writer module 70 stores the diagnostic result message in the diagnostic results database 27. The routine 1100 then returns to block 1102 where additional diagnostic result messages are received. Subsequent messages received by the log writer module 70 are stored in the diagnostic result database 27 in a similar manner.

Figure 12:
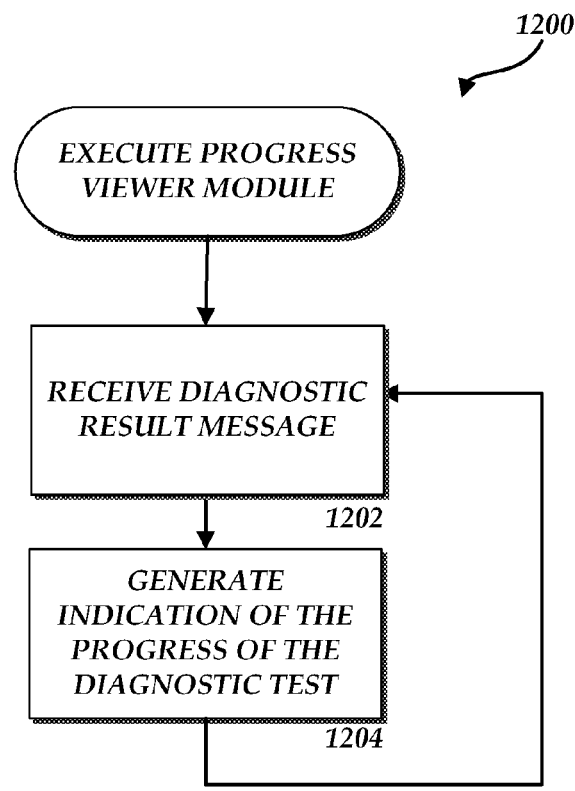
FIG. 12 is a flow diagram illustrating the operation of a progress viewer module utilized in one embodiment of the invention.

Referring now to FIG. 12, an illustrative routine 1200 will be described illustrating the operation of the progress viewer module 54. As described briefly above, the progress viewer module 54 receives diagnostic result messages from the diagnostic event service module 30 and generates a viewable indication of the progress of the diagnostic test. Accordingly, the routine 1200 begins at block 1202 where the progress viewer module receives a diagnostic result message. The routine 1200 then continues to block 1204 where the progress viewer module 54 generates an indication of the progress of the diagnostic test based upon the diagnostic result message. In particular, the progress viewer module 54 displays an indication on a graphical user interface of the progress of the diagnostic test. An illustrative user interface is described above with respect to FIG. 5. It should be appreciated, however, that other types of viewable indications may also be provided by the progress viewer module 54. From block 1204, the routine 1200 returns to block 1202 where additional diagnostic result messages are received.

Figure 13:
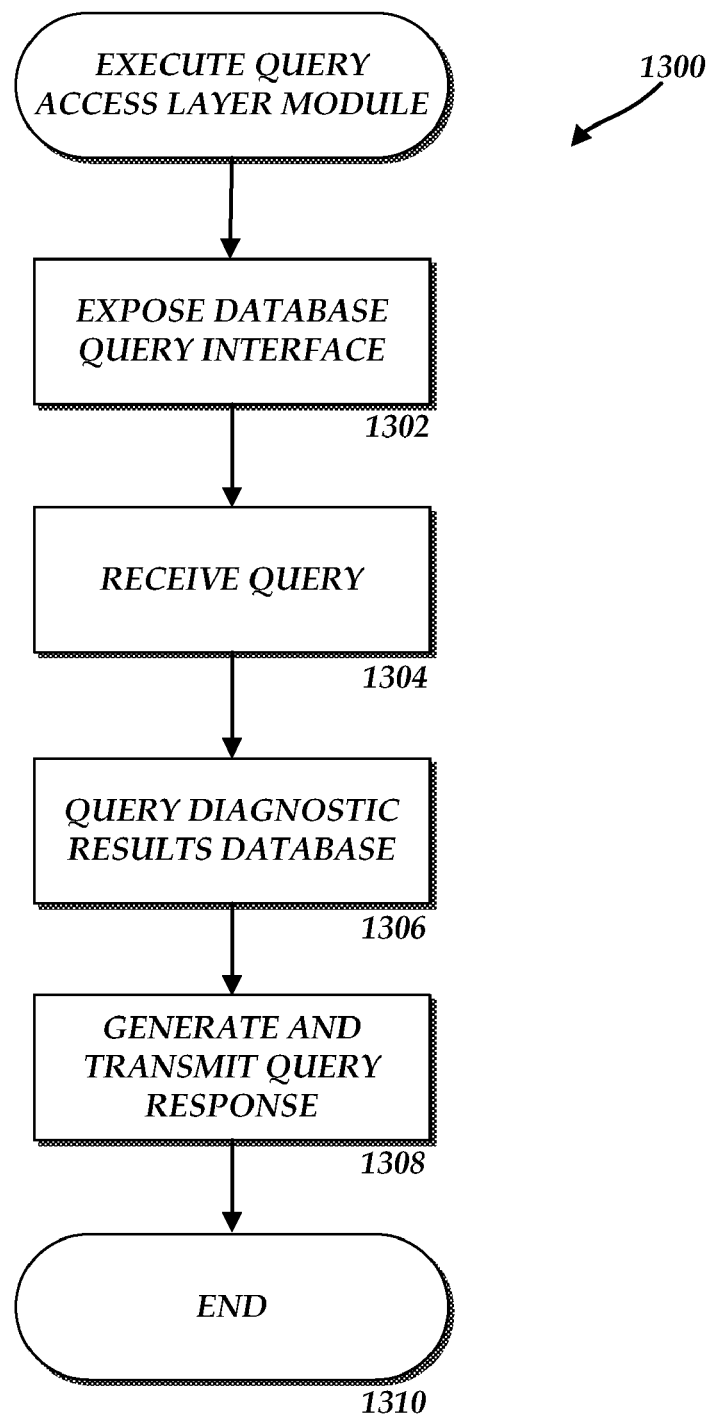
FIG. 13 is a flow diagram illustrating the operation of a query access layer module utilized in one embodiment of the invention.

Referring now to FIG. 13, additional details regarding the operation of the query access layer module 72 will be described. In particular, a routine 1300 will be described showing the operation of the query access layer module 72 according to one embodiment of the invention. As described briefly above, the query access layer module 72 provides a database query interface 74 that allows external access to the diagnostic database 27. Accordingly, the routine 1300 begins at block 1302 where the query access layer module 72 exposes the database query interface 74 to outside callers.

From block 1302, the routine 1300 continues to block 1304 where a query is received by the query access layer module 72 at the interface 74. In response to receiving a query, the routine 1300 continues to block 1306 where a query is performed on the diagnostic results database 27. Results are retrieved from the diagnostic results database 27, if any, and formatted as a response to the query request. At block 1308, the query response is transmitted to the calling program. As an example, the log viewer module 76 may format and transmit a query request to the query access layer module 72. Based on the query request, the query access layer module 72 may search the diagnostic results database 27. Any search results matching the query request are then formatted by the query access layer module 72 and returned to the log viewer module 76. Additional details regarding the operation of the log viewer module 76 will be provided below with respect to FIG. 15. From block 1308, the routine 1300 continues to block 1310, where it ends.

As discussed above, the messages exchanged between the various components of the present invention are formatted utilizing an XML in one embodiment. In particular, queries transmitted to the query access layer module 72 are formatted using XML in the manner shown below in TABLE 6.

TABLE 6

```
<QUERY>
    <DIAG>
        <RPTDIAGFILTER>
    </RPTDIAGFILTER>
    </DIAG>
    <INTDIAG>
        <RPTDIAGFILTER>
        </RPTDIAGFILTER>
    </INTDIAG>
    <PROGERRMSG>
        <STDMESSAGEFILTER>
        </STDMESSAGEFILTER>
    </PROGERRMSG>
    <GENMESSAGE>
        <STDMESSAGEFILTER>
        </STDMESSAGEFILTER>
    </GENMESSAGE>
    <DEBUGMSG>
        <STDMESSAGEFILTER>
        </STDMESSAGEFILTER>
    </DEBUGMSG>
</QUERY>
```

As shown in TABLE 6, a number of message filters may be provided identifying the types of messages that should be retrieved by the query. Other parameters for the query request may also be identified utilizing the XML structure shown in TABLE 6. The message filters, identified as tags "RPTDIAGFILTER" and "STDMESSAGEFILTER" in Table 6 are shown in TABLES 7 and 8.

TABLE 7

```
<RPTDIAGFILTER>
    <APPS></APPS>
    <MACHINES></MACHINES>
    <MODULES></MODULES>
    <DATE STARTDATE="mm/dd/yyy"
        ENDDATE="mm/dd/yyyy"/>
    <RETURNFIELDS></ RETURNFIELDS>
    <RESULT FILTER="PASS, FAIL, or ALL"/>
</RPTDIAGFILTER>
```

TABLE 8

```
<STDMESSAGEFILTER>
    <APPS></APPS>
    <MACHINES></MACHINES>
    <MODULES></MODULES>
    <DATE STARTDATE="mm/dd/yyy"
        ENDDATE="mm/dd/yyyy"/>
    <RETURNFIELDS></ RETURNFIELDS>
</STDMESSAGEFILTER>
```

Figure 14:
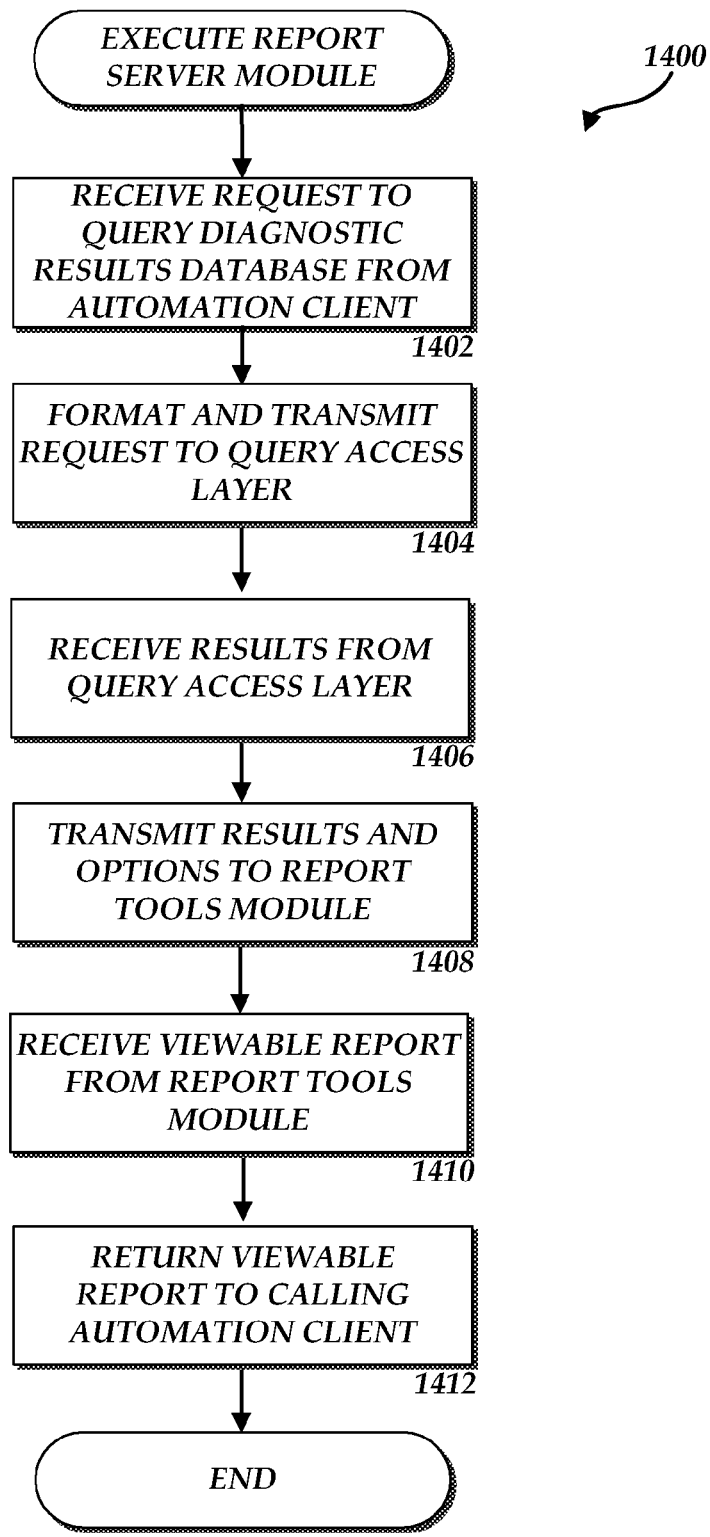
FIG. 14 is a flow diagram illustrating the operation of a report server module utilized in one embodiment of the invention.

Referring now to FIG. 14, additional details regarding the operation of the report server module 80 will be provided. As described briefly above, the report server module 80 exposes a report generator interface 82 that may be called by scripts or other automation clients to gain access to the contents of the diagnostic results database 27. The routine 1400 illustrates the operation of the report server module 80 in this regard.

The routine 1400 begins at block 1402 where a request is received querying the diagnostic results database 27 from a script, such as the trouble ticket script 84, or the report script 86, or from another automation client. From block 1402, the routine 1400 continues to block 1404 where a query request is formatted and transmitted to the query access layer module 72 by the report server module 80. As described briefly above, in response to receiving such a request, the query access layer module 72 is operative to search the diagnostic results database 27 and return search results.

At block 1406, the report server module 80 receives the search results from the query access layer module 72. In response to receiving the search results, the report server module 80 may return the results to the calling script or other automation client. Alternatively, the report server module 80 may transmit the results to the report tools module 78. As described briefly above, the report tools module 78 is operative to generate a viewable report based on the raw search results returned from the query access layer module 72. Accordingly, at block 1408, the search results are transmitted to the report tools module 78 from the report server module 80.

Along with the search results, the report server module 80 may also transmit options instructing the report tools module 78 as to how the viewable report should be prepared. At block 1410, the viewable report is received at the report server module 80 from the report tools module 78. From block 1410 the routine continues to 1412, where the viewable report is returned to the calling script or other automation client. In this manner, a viewable or printable report may be provided to a script or other automation client in a manner previously unavailable. From block 1412, the routine 1400 continues to block 1414 where it ends.

Figure 15:
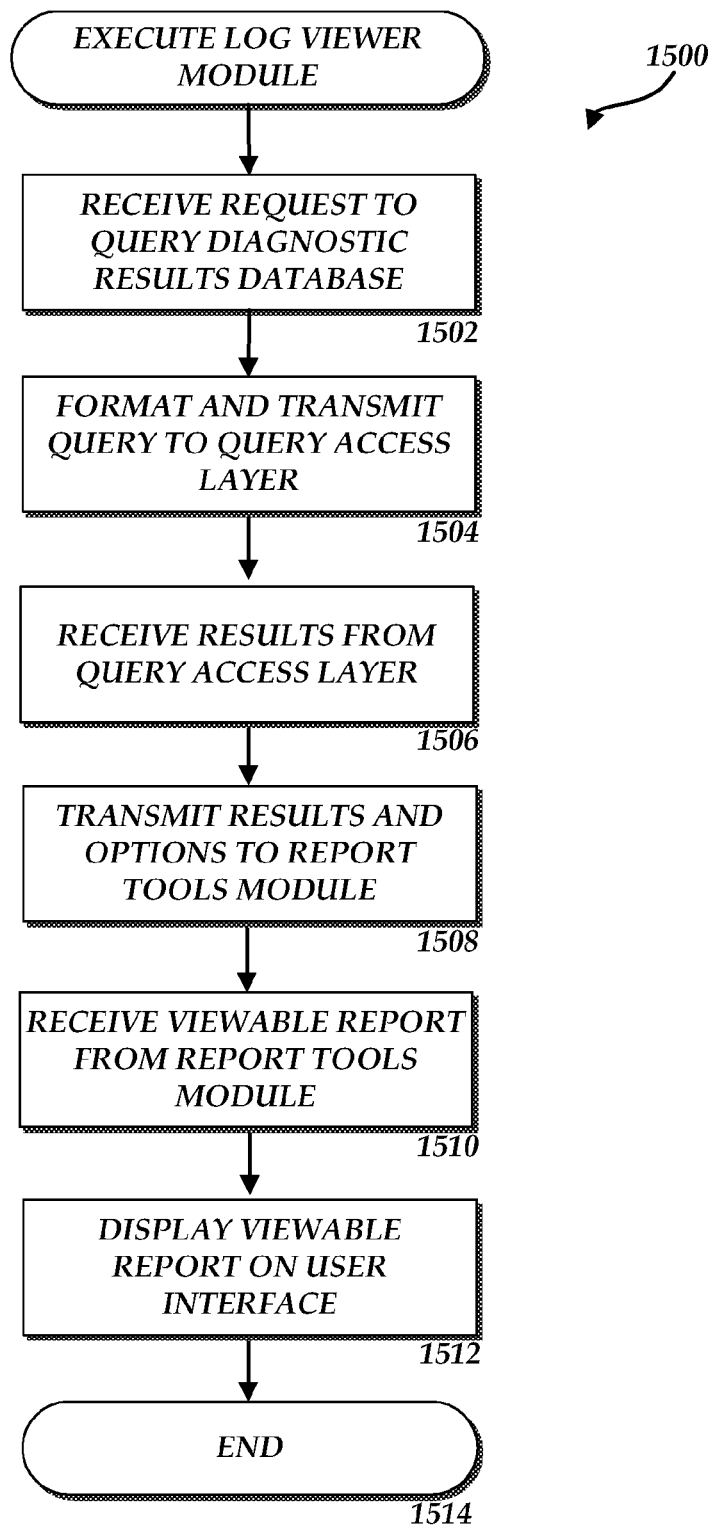
FIG. 15 is a flow diagram illustrating the operation of a log viewer module utilized in one embodiment of the invention.

Referring now to FIG. 15, an illustrative routine 1500 will be described illustrating an operation of the log viewer module 76. As described briefly above, the log viewer module 76 provides a user interface for building queries that identify diagnostic result messages to be retrieved from the diagnostic results database 27. The log viewer module then sends a query to the query access layer module 72 for the identified messages. When the results of the query are returned, the log viewer module 76 displays the results. Accordingly, the routine 1500 begins at block 1502 where a request is received to query the results database. This request may be provided by a user in the form of selecting the category of diagnostic result messages to be retrieved from the database 27.

From block 1502, the routine 1500 continues to block 1504 where a query is formatted and transmitted from the log viewer module 76 to the query access layer module 72. In response to receiving the query request, the query access layer module 72 queries the diagnostic results database 27 based on the contents of the request. The query access layer module 72 then returns the results to the log viewer module 76.

At block 1506, the log viewer module receives the results from the query access layer module 72. As described above, the report tools module 78 may be utilized by the log viewer module 76 to generate a viewable report from the raw search results returned by the query access layer module 72. In this scenario, the log viewer module 76 transmits the results received from the query access layer module 72 to the report tools module 78 at block 1508. Additionally, the log viewer module 76 may transmit options to the report tools module 78 indicating how the viewable report should be formatted.

From block 1508, the routine 1500 continues to block 1510 where the viewable report is received at the log viewer module 76 from the report tools module 78. At block 1512, the log viewer module 76 displays the viewable report on a user interface device. The routine 1500 then continues from block 1512 to block 1514, where it ends.

Based on the foregoing, it should be appreciated that various embodiments of the invention provide a method, system, apparatus, and computer-readable medium for logging and accessing diagnostic result messages. The above specification, examples and data provide a complete description of the manufacture and use of the composition of the invention. Since many embodiments of the invention can be made without departing from the spirit and scope of the invention, the invention resides in the claims hereinafter appended.

We claim:

1. A system for logging diagnostic result messages and providing access to the diagnostic result messages, comprising:

one or more diagnostic client modules capable of performing diagnostic tests on one or more managed elements of a computer system, of generating one or more diagnostic result messages during the performance of the diagnostic test, and of transmitting the one or more diagnostic result messages to a diagnostic event service module;

a diagnostic event service module operative to receive the one or more diagnostic result messages from the diagnostic client modules and to provide the diagnostic result messages to one or more diagnostic subscriber modules;

one or more diagnostic subscriber modules operative to communicate with the diagnostic event service module, to receive the diagnostic result messages from the diagnostic event service module, and to store the diagnostic result messages in a diagnostic results database; and a log viewer module operative to provide a user interface for receiving a request identifying at least one of the diagnostic result messages to be retrieved from the diagnostic results database, the user interface including one or more input areas for receiving a selection of at least one of the one or more managed elements of the computer system for which the diagnostic result messages are to be retrieved from the diagnostic results database and including one or more input areas for receiving a selection of an application source from which a diagnostic test associated with the diagnostic result messages to be retrieved from the diagnostic results database was originally executed.

2. The system of claim 1, wherein a one of the one or more diagnostic subscriber modules comprises a log writer operative to receive the diagnostic result messages from the diagnostic event service module and to store the diagnostic result messages in the diagnostic results database.

3. The system of claim 2, wherein a one of the one or more diagnostic subscriber modules comprises a progress viewer module operative to receive the diagnostic results messages and to display an indication of the progress of the diagnostic tests based on the diagnostic results messages.

4. The system of claim 1, further comprising a query access layer module operative to provide an interface to an external program that is used by the external program to query the diagnostic result messages stored in the diagnostic results database.

5. The system of claim 4, further comprising a report server module operative to provide an interface to an automation client that is used by the automation client to query the diagnostic result messages stored in the diagnostic results database via the query access layer module.

6. The system of claim 5, wherein the report server module is operative to receive a request to query the diagnostic results database from the automation client, to format and transmit a query to the query access layer module in response to the request, to receive a query response from the query access layer module, to transmit a request to generate a viewable report to the report tools module including the query response, to receive the viewable report from the report tools module, and to provide the viewable report to the automation client in response to the request to query the diagnostic results database.

7. The system of claim 1, wherein the log viewer module is further operative to format and transmit a query to a query access layer module in response to the request, the query access layer module operative to:
receive the query from the log viewer module,
query the diagnostic results database for the diagnostic result messages matching the at least one of the one or more managed elements and the application source selected via the user interface, and
provide a query response including the matching diagnostic result messages to the log viewer module for display.

8. The system of claim 7, further comprising a report tools module operative to generate a viewable report from the query response, and wherein the log viewer module is further operative to transmit a request to generate a viewable report to the report tools module including the query response, to receive the viewable report from the report tools module, and to display the viewable report.

9. The system of claim 8, wherein the report tools module is further operative to accept options with a request to generate a viewable report and to customize the viewable report based upon the options.

10. The system of claim 1, wherein the diagnostic event service module comprises:
a client message handler object operative to receive the one or more diagnostic result messages from the diagnostic client modules and to transmit the diagnostic result messages to a dispatcher thread;
a dispatcher thread operative to receive the one or more diagnostic result messages and to identify a subscriber thread for receiving each of the diagnostic result messages based on subscription information provided by one or more subscriber proxy objects associated with the subscriber threads;
one or more subscriber proxy objects for receiving the subscription information from the one or more subscriber modules; and
one or more subscriber threads operative to receive the one or more diagnostic result messages from the dispatcher thread and to transmit the diagnostic result messages to the one or more diagnostic subscriber modules.

11. The system of claim 1, wherein the diagnostic result messages comprise data structures expressed using an extensible markup language.

12. The system of claim 1, wherein the user interface further includes one or more input areas for receiving a selection of how the retrieved diagnostic result messages are to be displayed and one or more input areas for receiving a range of dates for the diagnostic result messages to be retrieved.

13. A method for logging diagnostic result messages and providing access to the diagnostic result messages, comprising:
generating a diagnostic result message during the performance of a diagnostic test on a managed element in a computer system;
receiving information from one or more diagnostic subscriber modules identifying one or more types of diagnostic result messages to be provided to each of the one or more diagnostic subscriber modules;
receiving the diagnostic result message;
identifying the one or more diagnostic subscriber modules that should receive the diagnostic result message based on the information received from the one or more diagnostic subscriber modules identifying the one or more types of diagnostic result messages to be provided to each of the one or more diagnostic subscriber modules;
forwarding the diagnostic result message to the identified one or more diagnostic subscriber modules;
storing the diagnostic result message in a diagnostic results database; and
providing a user interface for receiving a request identifying at least one of the diagnostic result messages to be retrieved from the diagnostic results database, the user interface including one or more input areas for receiving a selection of the managed element in the computer system for which at least one of the diagnostic result messages is to be retrieved from the diagnostic results database and including one or more input areas for receiving a selection of an application source from which a diagnostic test associated with the at least one diagnostic result messages to be retrieved from the diagnostic results database was originally executed.

14. The method of claim 13, further comprising:
receiving the diagnostic result message at a one of the one or more diagnostic subscriber modules; and based upon the diagnostic result message, generating an indication of the progress of the diagnostic test.

15. The method of claim 14, further comprising:
displaying the indication on a graphical user interface provided by the computer system.

16. The method of claim 13, further comprising:
providing an interface to an external program that is used by the external program to query the diagnostic result messages stored in the diagnostic results database;

receiving a query at the interface and retrieving data from the diagnostic results database based upon the query; and returning, to the external program, the data retrieved from the diagnostic results database in response to the query received from the external program.

17. The method of claim 13, wherein the user interface is provided by a log viewer module, the method further comprising:
formatting and transmitting a query to a query access layer module in response to the request;

receiving the query from the log viewer module at the query access layer module;

querying the diagnostic results database for the diagnostic result messages matching the at least one of the one or more managed elements and the application source selected via the user interface; and providing a query response including the matching diagnostic result messages to the log viewer module for display.

18. The method of claim 17, further comprising:
receiving the query response retrieved from the diagnostic results database;

transmitting a request to a report tools module for a viewable report, the request comprising the query response retrieved from the diagnostic results database and options for customizing the report;

generating a viewable report including the query response retrieved from the diagnostic results database and customized based upon the options; and displaying the viewable report.

19. The method of claim 13, further comprising:
providing an interface to an automation client that is used by the automation client to query the diagnostic result messages stored in the diagnostic results database;

formatting and transmitting a query received from the automation client to the diagnostic results database;

retrieving data from the diagnostic results database based upon the query; and returning, to the automation client, the data retrieved from the diagnostic results database in response to the query received from the automation client.

20. The method of claim 19, wherein the query is formatted and transmitted to the diagnostic results database by a report server module.

21. A computer-readable storage medium comprising computer-executable instructions which, when executed by a computer, cause the computer to perform the method of claim 13.

22. A computer-controlled apparatus capable of performing the method of claim 13.

* * * * *